(12) United States Patent
Shida et al.

(10) Patent No.: US 8,111,667 B2
(45) Date of Patent: *Feb. 7, 2012

(54) WIRELESS TRANSCEIVER

(75) Inventors: Masaaki Shida, Hachioji (JP); Tatemi Ido, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 447 days.

This patent is subject to a terminal disclaimer.

(21) Appl. No.: 12/367,772

(22) Filed: Feb. 9, 2009

(65) Prior Publication Data

US 2009/0147838 A1    Jun. 11, 2009

Related U.S. Application Data

(63) Continuation of application No. 11/211,690, filed on Aug. 26, 2005, now Pat. No. 7,493,092.

(30) Foreign Application Priority Data

May 30, 2005    (JP) .................................. 2005-156687

(51) Int. Cl.
*H04W 4/00*    (2009.01)
(52) U.S. Cl. ........ 370/334; 370/360; 370/386; 375/299; 455/501
(58) Field of Classification Search ........................ None
See application file for complete search history.

(56) References Cited

U.S. PATENT DOCUMENTS

| 5,099,475 | A | * | 3/1992 | Kozaki et al. | 370/422 |
| 7,031,419 | B2 | | 4/2006 | Piirainen | 375/358 |
| 7,493,092 | B2 | * | 2/2009 | Shida et al. | 455/103 |
| 2002/0039884 | A1 | | 4/2002 | Raynes et al. | 455/13.3 |
| 2003/0128708 | A1 | | 7/2003 | Inoue et al. | 370/395.4 |
| 2006/0045199 | A1 | | 3/2006 | Kim | 375/267 |

FOREIGN PATENT DOCUMENTS

| JP | 134077 | 5/2003 |
| JP | 2004072624 | 3/2004 |
| JP | 515176 | 5/2004 |
| JP | 2004515176 | 5/2004 |
| JP | 179821 | 6/2004 |
| JP | 2004194262 | 7/2004 |

OTHER PUBLICATIONS

IEEE Std. 802.11a-1999, IEEE.
IEEE Std. 802.119-2003, IEEE.

(Continued)

*Primary Examiner* — Chi H. Pham
*Assistant Examiner* — Shick Hom
(74) *Attorney, Agent, or Firm* — Brundidge & Stanger, P.C.

(57) ABSTRACT

In a MIMO wireless transceiver, priority control that judges priority of transmit data and a transmission mode table are provided to control an option as to which transmission system SDM or STBC is selected, coding rate and modulation method based on a transmission mode for a transmission destination that is determined by priority of transmission data and status of a communication matrix at the time of data transmission. With such arrangement, a wireless communication system composed of the MIMO wireless transceiver can control coding, MIMO signal processing and modulation methods according to priority of transmit data. More specifically, it is possible to ensure transmission of data having higher priority and improve throughput in total when a plurality of types of data are transmitted.

15 Claims, 11 Drawing Sheets

OTHER PUBLICATIONS

P.W. Wolnlansky, G.J. Foschini, G.D. Golden, R.A. Valenzuela, "V-BLAST: An Architecture for Realizing Very High Data Rates Over the Rich-Scattering Wireless Channel,", Proc. IEEE ISSSE-98, Pisa, Italy, Sep. 30, 1998, IEEE.

Edited by Masahiro Morikura, Shuji Kubota, "Revised 802.11 High-Speed Wireless LAN Text Book", Dec. 21, 2004, Impress (original and English translation).

Vahid Torokh, Siavash M. Alamouti, Patric Poon, "New Detection Schemes for Transmit Diversity with no Channel Estimation", Proc. IEEE ICUPC1998. pp. 917-920, vol. 2.

Japanese Office Action, dated Jun. 15, 2010 issued in corresponding Japanese Patent Application No. 2005-156687 along with English language translation.

* cited by examiner

FIG. 4

| MAC ADDRESS | TRANSMISSION MODE VALUE | FINAL ACCESSING TIME |
|---|---|---|
| 12:34:56:78:90:AB | M1 | 12:34:56 |
| 12:34:56:78:90:FF | M2 | 11:00:00 |
| 12:34:56:78:00:00 | M4 | 12:34:55 |
| — | — | — |

164

WIRELESS TRANSCEIVER

CLAIM OF PRIORITY

The present application is a continuation of application Ser. No. 11/211,690 filed Aug. 26, 2005, now U.S. Pat. No. 7,493,092, which claims priority from Japanese application JP 2005-156687, filed on May 30, 2005, the contents of which are hereby incorporated by reference into this application.

FIELD OF THE INVENTION

The present invention relates to a wireless transceiver of a MIMO wireless communication system which uses at least two or more antennas for each of a transmitter and a receiver, and more specifically to a wireless transceiver that is suitable for usage environment where transmission of image data, audio data, etc. is conducted and thus transmission quality is questioned.

BACKGROUND OF THE INVENTION

As a conventional wireless communication system, there is a wireless LAN system that is standardized by the IEEE 802.11 (See non-patent references 1 and 2).

A technology in which transmission is controlled according to priority of data has been known in the field of the wireless LAN technology. Patent reference 1 discloses a technology in which a coding rate and a modulation method are controlled according to priority of packets. In addition, patent reference 2 discloses a technology in which image data is transferred in the above-stated method. The standard of the TGe (IEEE 802.11 Task Group e) for specific priority is described in non-patent reference 3 shown below, for example.

On the other hand, in the wireless LAN technology, a MIMO (Multiple-Input Multiple-Output) transmission system is attracting a lot of attention. The feature of the MIMO transmission lies in the arrangement that enables, in a wireless transceiver, higher transmission speed than that of conventional wireless LAN systems and stable communication even under multi-path (reflected wave) environment by performing data transmission and reception by using a plurality of antennas for subsequent data synthesis and decoding.

Known examples of the MIMO transmission include a method as shown in non-patent reference 4 in which original transmit data is divided into a plurality of transmission streams, which are then transmitted simultaneously from a plurality of antennas (SDM: Space Division Multiplexing), and a method as shown in non-patent reference 5 in which, while using the same data rate as the case where an antenna is used for each of regular transmission and reception, wireless transmission is performed more securely than conventional methods by using transmission/reception diversity (STBC: Space Time Block Coding). The MIMO signal processing under the SDM method makes it possible to set the data rate higher in proportion to the number of transmission antennas unlike a wireless system where an antenna is used for each of regular transmission and reception. While it will not make the data rate higher, the signal processing under the STBC method realizes more assured wireless transmission with the increased number of antennas.

It should be noted that patent reference 3 shown below discloses a wireless communication system of a hybrid type where a transmission method according to the MIMO standard and a transmission method based on another standard are combined.

[Patent Reference 1]
  Japanese Patent Laid-open No. 2004-179821
[Patent Reference 2]
  Japanese Patent Laid-open No. 2003-134077
[Patent Reference 3]
  Japanese Patent Laid-open No. 2004-515176
[Non-patent Reference 1]
  IEEE Std. 802.11a-1999, IEEE
[Non-patent Reference 2]
  IEEE Std. 802.11g-2003, IEEE
[Non-patent Reference 3]
  Edited by Masahiro Morikura, Shuji Kubota, "Revised 802.11 High-Speed Wireless LAN Text Book", Dec. 21, 2004, Impress
[Non-patent Reference 4]
  P. W. Wolniansky, G. J. Foschini, G. D. Golden, R. A. Valenzuela, "V-BLAST: An Architecture for Realizing Very High Data Rates Over the Rich-Scattering Wireless Channel", Proc. IEEE ISSSE-98, Pisa, Italy, Sep. 30, 1998, IEEE
[Non-patent Reference 5]
  Vahid Torokh, Siavash M. Alamouti, Patric Poon, "New Detection Schemes for Transmit Diversity with no Channel Estimation", Proc. IEEE ICUPC1998, pp. 917-920, Vol. 2

SUMMARY OF THE INVENTION

First, in order to describe problems, a configuration of a wireless transceiver of a wireless LAN system according to a prior art will be described with reference to FIGS. 2 and 3.

FIG. 2 is a block diagram of a wireless transceiver of a wireless LAN system according to the prior art. FIG. 3 is a diagram illustrating that transmit data is stored in a queue of priority control unit in the priority control of transmit data.

A wireless LAN system 1 according to the prior art is configured with wireless transceivers 2a and 2b. Transmit data 3a is buffered in a priority control unit 10a and is controlled so that data having higher priority may be likely to be transmitted ahead of others. The transmit data buffered in the priority control unit 10a is then coded by an encoder 11a to enhance error resistance characteristics during wireless transmission. Subsequently, the encoded transmit data is divided into transmission streams by a MIMO signal processing unit 12a. When an antenna 18a is composed of two sub-antennas as shown in FIG. 2, the MIMO signal processing unit 12a generates two transmission streams from the transmit data. The generating processes will be described later.

Here, operations of a priority control unit 10 will be described with reference to FIG. 3. The priority control unit 10 uses a system that is under standardization by the IEEE 802.11 Task Group e (TGe) stated in the above-stated patent reference 3 will be used. The transmit data 3a is provided with priority in advance and is input to the priority control unit 10 by an application. In the priority control unit 10, the transmit data is classified into four priority levels (101). Data where great importance is given to latency like voice is provided with the highest priority, and such data is classified here as AC_VO (102). Further, data where a slight amount of buffering is permitted like a video signal is classified as AC_VD which has the second priority (103). Furthermore, regular data is classified as AC_BE which has the third priority (104). Data having low urgency like background data is classified as AC_BG which has the lowest priority (105). As shown in FIG. 3, buffers 102 to 105 are provided to store data therein according to the four classification categories. Each buffer is configured as a FIFO (First-In First-Out) structure allowing data to be output starting from the one that is input earlier. When data exists in either one of such buffers, by arranging, as a step to determine the data to be actually transmitted, that data having higher priority is likely to be transmitted in terms of probability, it is possible to transmit data having higher priority on a priority basis.

Examples of the MIMO transmission system include two methods: one is the SDM shown in non-patent reference 4 which increases the data rate; and the other is the STBC which is shown in non-patent reference 5.

The MIMO signal processing unit 12a uses either of the above-stated SDM or STBC to generate two transmission streams. Each of the streams is modulated by using an appropriate modulation method in a modulator 13a, up-converted to a radio-frequency signal in a transmission RF (Radio Frequency) unit 14a, and is transmitted from the antenna 18a via a transmission/reception selector switch 17a. In the receiver, the signal received at an antenna 18b is amplified in a reception RF unit 20b, down-converted therein, and is input to a demodulator 21b. In order for the receiver to obtain information such as the modulation method and the coding rate that are used by the transmitter, a mechanism is required which notifies of the receiver the modulation method and the coding rate that were used together with transmit data. Usually, such information is transmitted as header information of transmit data when the date is transmitted. Details of such frame structures can be realized by using methods that are disclosed in the above-stated non-patent references 1 and 2. A plurality of signals that are decoded in the demodulator 21b are input to a MIMO signal processing unit 22b, converted into one data matrix, and is then input to a decoder 23b. The data of which errors are corrected in the decoder 23b is checked in a retransmission control unit 24b whether or not a reception frame is correctly received. If the retransmission control unit 24b judges the reception frame is correctly received, the control unit 24b transmits an ACK (Acknowledgment) frame within a specific time period. If the control unit 24b judges the reception frame is wrongly received, the control unit 24b transmits a NACK (Not Acknowledgment) frame within a specific time period or in predetermined timing. Here, the ACK frames and the NACK frames shall be referred to collectively as the responding frames. These responding frames are configured in the retransmission control unit 24b, input to the encoder 11b, and are processed as is the case with the transmission processing of the transceiver 2a described earlier before being transmitted. The transceiver 2a is able to learn whether or not the transmit data has been correctly received by receiving the responding frame transmitted from the transceiver 2b. Upon receipt of an ACK frame, the transceiver 2a judges the transmit data could be correctly transmitted to the transceiver 2b, and erases the transmit data that has been buffered in the priority control unit 10a. Further, upon receiving a NACK frame, or upon not receiving a responding frame within a prescribed time period or in prescribed timing, the transceiver 2a judges the transmit data could not be transmitted correctly to the transceiver 2b, and retransmits (resends) the data that was transmitted before. By repeating resending of the data, it is possible to finally transmit the transmit data to the transmission destination. Here, occurrence of resending induces an assumption that conditions of transmission matrix was likely to be poor at the time of transmitting the earlier transmit data. Consequently, when resending the data, the transceiver 2a changes the modulation method, the coding rate and the MIMO signal processing method so that a method can be selected that enables more secure data transmission than previous transmission.

For example, in the MIMO, the following table 1 shows combination of bit rates, modulation method and coding rate at the time of data transmission.

TABLE 1

| Bit Rate | Modulation | Coding Rate |
|---|---|---|
| 6 Mbps | BPSK | ½ |
| 9 Mbps | BPSK | ¾ |
| 12 Mbps | QPSK | ½ |
| 18 Mbps | QPSK | ¾ |
| 24 Mbps | 16 QAM | ½ |
| 36 Mbps | 16 QAM | ¾ |
| 48 Mbps | 64 QAM | ½ |
| 54 Mbps | 64 QAM | ¾ |

An example shown in this table provides four types of modulation methods BPSK, QPSK, 16 QAM and 64 QAM, and two types of coding rate ½ and ¾, and thus realizes 8 kinds of combination in total by combining the modulation methods with the coding rates with respective of one another. To achieve the maximum data rate, the 64 QAM can be chosen for the modulation method and the ¾ can be chosen for the coding rate. However, in this case, the error resistance characteristic becomes lower compared to other types of combination. Therefore, when a transmission error occurs, resulting in necessity of resending data, the 16 QAM, the QPSK and the BPSK will be chosen for the modulation method step by step to achieve more secure transmission. Likewise, for the coding rate, since ½ offers stronger error resistance characteristic than ¾, if a transmission error occurs, use of ½ will enable enhanced error resistance characteristic.

Further, also the MIMO signal processing method can transmit data efficiently in the similar manner by using the above-stated STBC when there are many transmission errors, and by using the SDM when conditions of the transmission matrix are good, that is, a distance between transceivers is short, for example, resulting in less data errors.

Conventionally, when facing deteriorated transmit conditions, a physical layer that controls coding, the MIMO signal processing and modulation/demodulation cannot receive the NACK frame and the ACK/NACK frame itself. Accordingly, its parameters are changed to reduce the data rate for example, and thus, the data transmission is tried. Therefore, the same operations are performed without discriminating data that requires latency like an audio signal or video streaming from other data, for example, thus offering a problem of inefficiency.

While describing a wireless transceiver that executes communication based on priority of data, the above-stated patent references 1 and 2 do not disclose the priority of data that is applied to an MIMO wireless transceiver by way of example. In addition, the above-stated patent reference 3 discloses a configuration in which a wireless communication system capable of MIMO transmission and reception switches paths according to degree of importance of data as shown by a tag of a data segment, but only switching is made between the MIMO transmission and reception modes that use a plurality of antennas and the mode that uses only one antenna. Thus, the wireless communication system does not offer consideration on SDM and the STBC, which are transmission systems used for the above-stated MIMO wireless transceiver.

The present invention has been made to solve the above-described problems. It is an object of the present invention to provide a wireless communication system comprising a MIMO wireless transceiver, in which coding, MIMO signal processing and a modulation method are controlled according to priority of transmission data. More specifically, the object of the invention is to provide a wireless communication system capable of securely transmitting data with higher priority, thereby improving the total throughput when a plurality of types of data are transmitted.

To solve the above-stated problems, in a wireless transceiver that executes MIMO transmission according to the present invention, priority control that judges priority of transmit data and a transmission mode table are provided to control an option as to which MIMO transmission system SDM or STBC is selected to transmit, a coding rate and modulation method based on priority of transmission data and a transmission mode of a transmission destination when the data is transmitted.

As a general rule, when priority is sufficiently high and errors should be reduced as much as possible, the STBC is used as a transmission method, the modulation method is set to BPSK, and the coding rate is set to be higher. When priority is lower, the setting should be reversed, wherein SDM is used as a transmission method, the modulation method is set to 64QAM and the coding rate is set to be lower. The status of communication matrix can be judged by the presence or absence of reception of an ACK frame or a NACK frame that is exchanged between transceivers, signal strength, and an eigen value of a transfer matrix as well.

As stated above, according to the wireless transceiver according to the present invention, it becomes possible to choose a MIMO signal processing method more flexibly, thus enabling further efficient wireless transmission of data having higher priority.

As stated above, since the MIMO wireless transceiver according to the present invention is arranged to choose coding, MIMO signal processing and modulation methods according to priority of transmit data, it is possible, in particular, to reduce the number of retransmission, shorten of transmission delay time and improve throughput, which are related to transmission of transmit data having higher priority, as compared with a conventional system wherein coding, MIMO signal processing and modulation methods are chosen according only to the status of transmission matrix regardless of priority of data. In addition, more flexible data transmission becomes possible, and further reduction in the number of retransmission times, shortening of transmission delay time and improvement in throughput can be achieved by using transmission matrix information that is obtained by applying the following two methods and coding, MIMO signal processing and modulation methods that are determined based on a transmission mode table according to priority of transmit data. One of the two methods is to learn the status of transmission matrix based on the reception power strength of a responding frame for transmit data or on an eigen value of transmission matrix that is obtained in MIMO signal processing. The other is to learn the status of transmission matrix by transmitting data after addition of information on the transmission matrix to a responding frame when a receiver receives transmission data, and allowing the transmitter to obtain this information.

BRIEF DESCRIPTION OF THE DRAWINGS

FIG. 4 is a diagram illustrating a transmission mode table by way of example;

DETAILED DESCRIPTION OF THE EMBODIMENTS

Embodiments according to the present invention will be described below with reference to FIGS. 1 and 4 to 12.

First Embodiment

A first embodiment according to the present invention will be described hereinafter with reference to FIGS. 1 and 4 to 9.

First, a configuration of a transceiver according to the embodiment of the present invention will be described with reference to FIG. 1.

Figure 1:
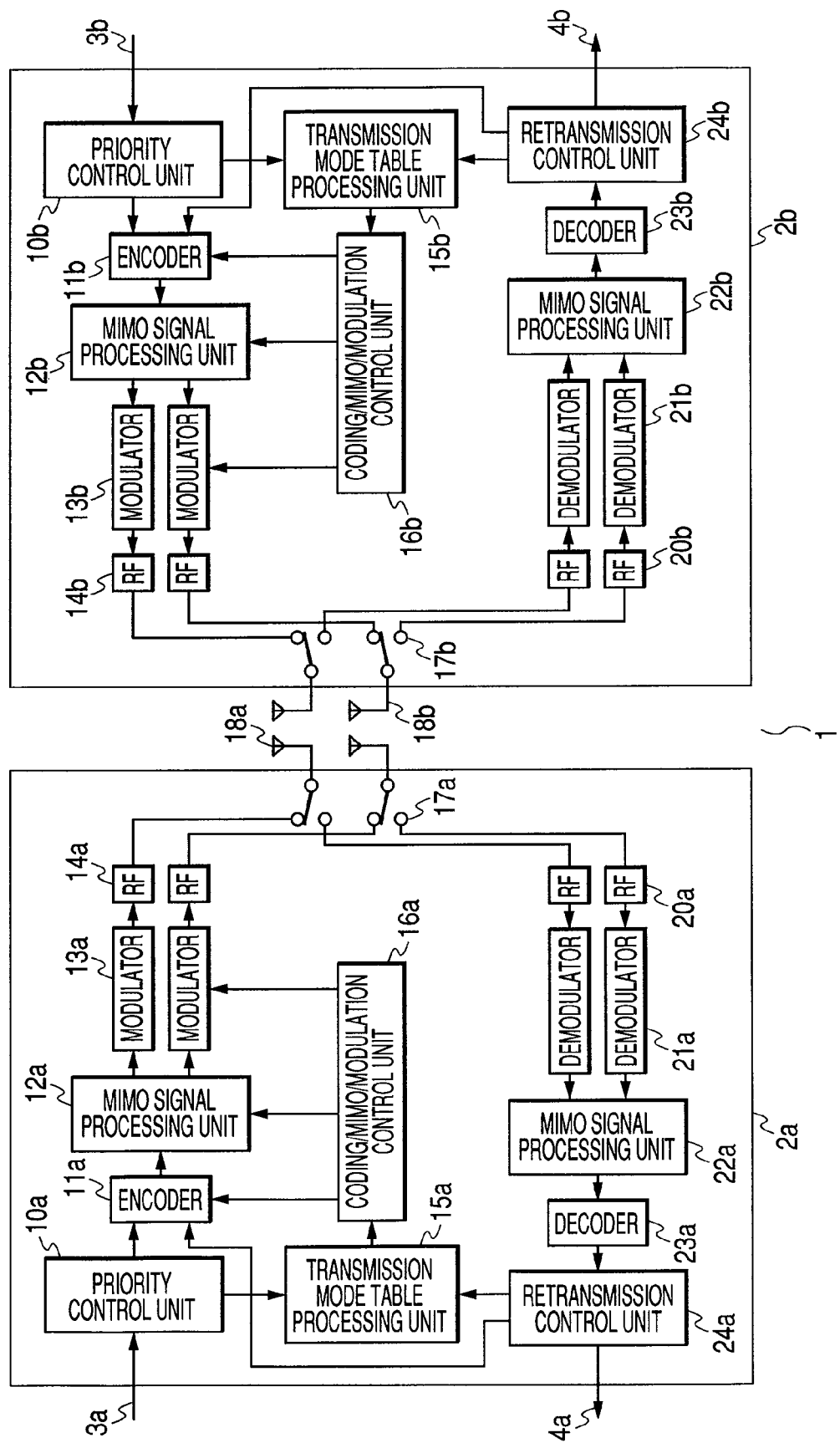
FIG. 1 is a block diagram of a transceiver according to a first embodiment of the present invention.
Figure 2:
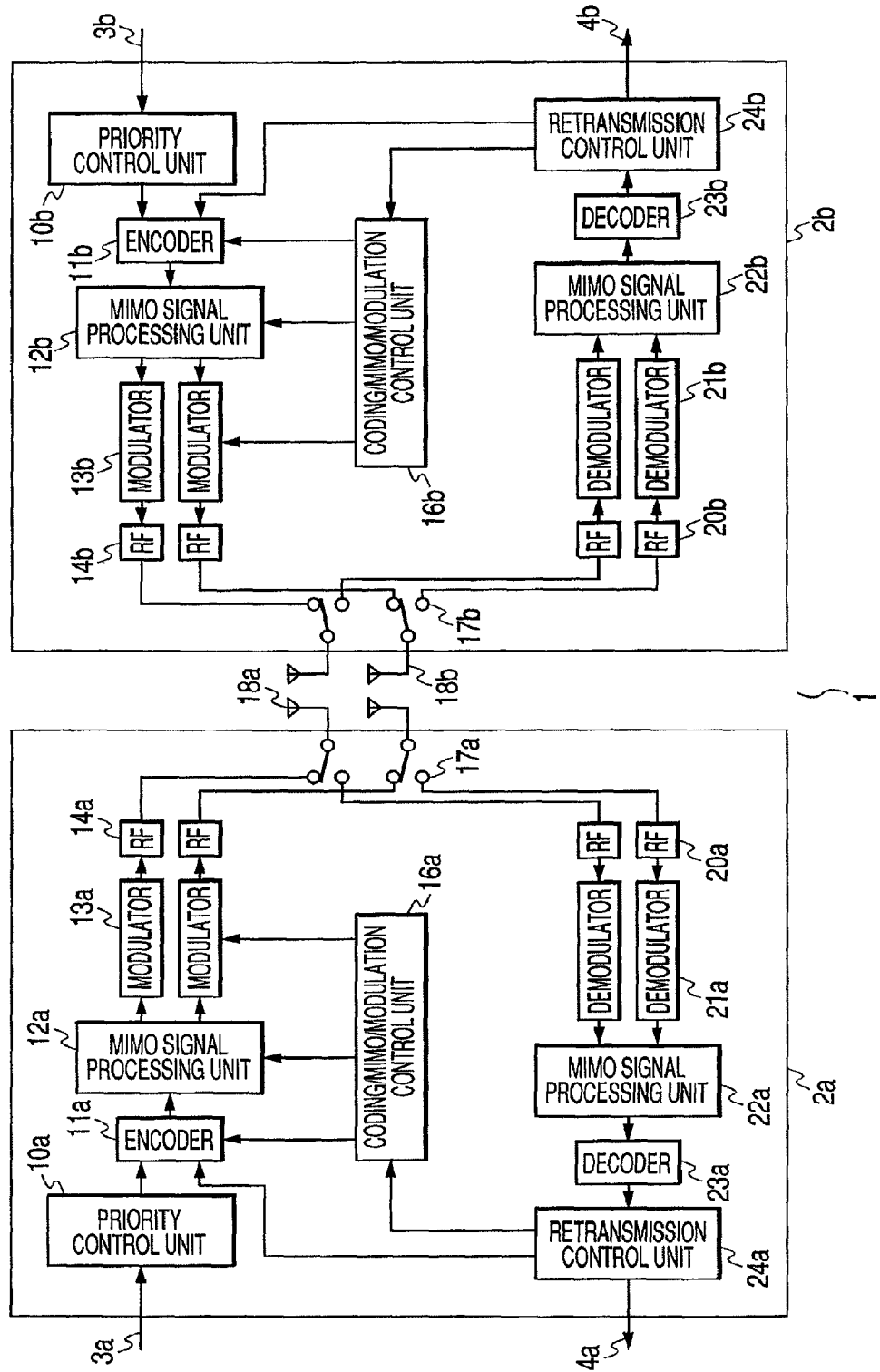
FIG. 2 is a block diagram of a wireless transceiver of a wireless LAN system according to a prior art.
Figure 3:
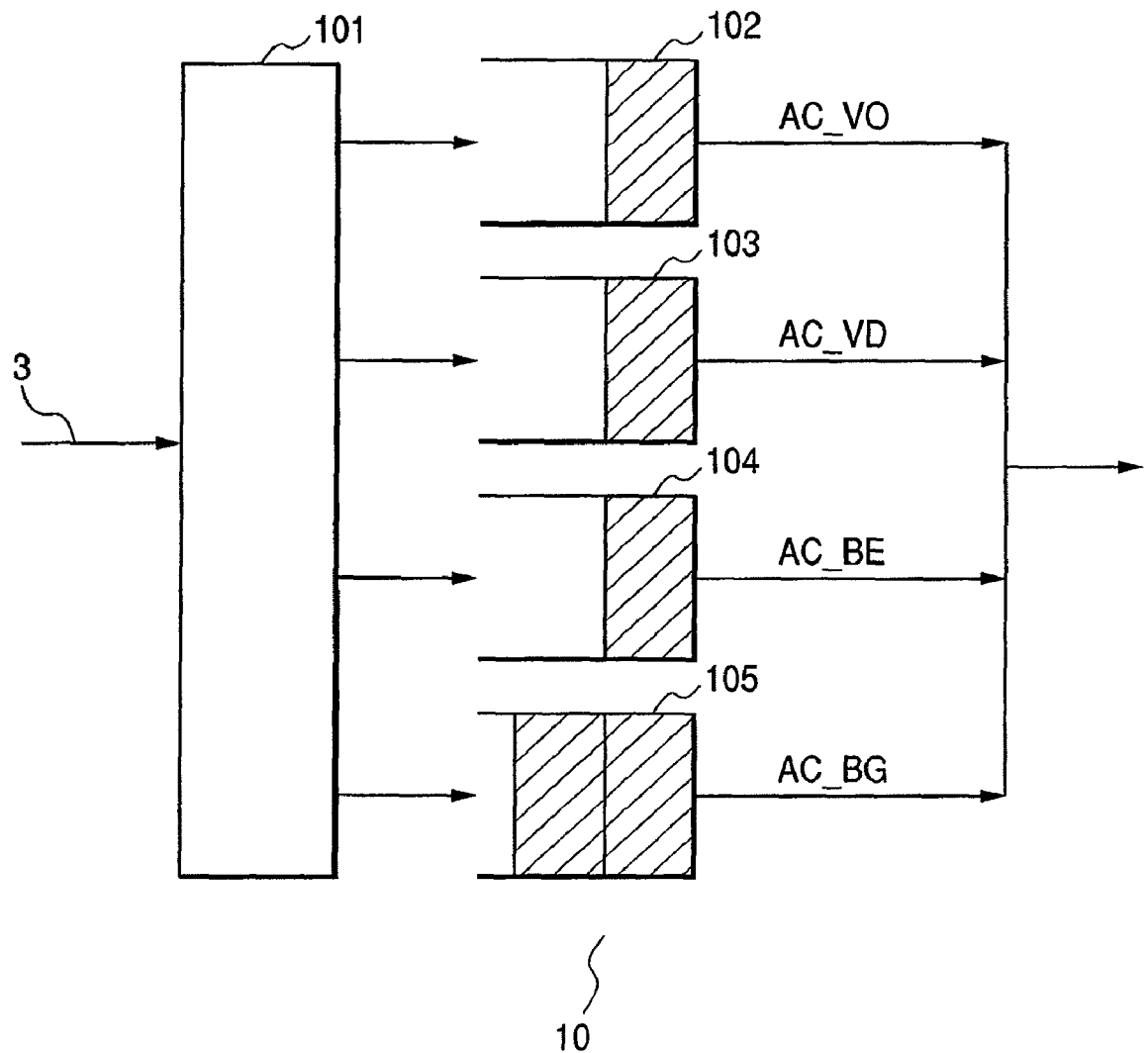
FIG. 3 is a diagram illustrating transmission data being stored in a priority control queue in a priority control of transmit data.

FIG. 1 is a block diagram of a transceiver 2 according to the first embodiment of the present invention.

In the MIMO wireless receiver according to the first embodiment of the present invention, transmit data 3a is buffered in a priority control unit 10a and is controlled so that data having higher priority can be preferentially transmitted ahead of others.

A MIMO wireless communication system 1 shown in the embodiment is such that a wireless transceiver 2a and a wireless transceiver 2b perform data communication wirelessly through a plurality of antennas.

The wireless transceiver 2a on the transmission side includes a priority control unit 10a, an encoder 11a, a MIMO signal processing unit 12a, a modulator 13a, a transmission RF unit 14a, a transmission mode table processing unit 15a, and a coding/MIMO modulation control unit 16a.

The transmit data 3a is input to the priority control unit 10a and is buffered in accordance with priority of data as described earlier for the background art. Then, the transmit data is encoded by the encoder 11a for correcting errors and is input to the MIMO signal processing unit 12a.

The MIMO signal processing unit 12a, as described earlier for the background art, generates two transmission streams using either one of the SDM or the STBC transmission system. Thereafter, the transmission streams are modulated by using an appropriate modulation method in the modulator 13a, and are up-converted into radio-frequency signals in the transmission RF unit 14a. Then the signals are passed through a transmission/reception selector switch 17a and are transmitted from an antenna 18a.

Operational description up to this process is the same as that for the background art. Here, the priority control unit 10a has a function in which, when data controlled by the priority control unit 10a is transmitted, information indicating which transmit data is classified into which priority, and an MAC address which is a physical identifier showing a transmission destination are transmitted to the transmission mode table processing unit 15.

The transmission mode table processing unit 15 searches a transmission mode table for a transmission mode on the basis of the MAC address of the transmission destination. The transmission mode table-processing unit 15 includes MAC addresses and transmission modes associated with each other, which will be described later.

Subsequently, the coding/MIMO/modulation control unit 16a determines coding, MIMO signal processing and modulation methods of respective transmit data, based on the transmission mode retrieved by the transmission mode table processing unit 15 and priority of transmit data thereof, and delivers the coding, MIMO signal processing and modulation methods to the above-stated encoder 11a, the MIMO signal processing unit 12a and the modulator 13a, respectively.

The transmission data is subjected to encoding, MIMO signal processing and modulation in respective units based on the information delivered, and is up-converted to a radio-frequency signal in the transmission RF unit 14a, and the signal is then transmitted from the antenna 18a.

The wireless receiver 2b on the receiver side transmits a responding frame in the same steps as those stated for the background art.

The wireless transmitter 2a processes the responding frame received in the same way as that described earlier for the background art for retransmission control.

Next, an example of a structure of the transmission mode table as well as a rule to determine the MIMO system, the coding and the modulation method will be described with respective to the transmission mode with reference to FIGS. 4 and 5.

FIG. 4 is a diagram illustrating an example of a transmission mode table. FIG. 5 is a graph showing a rule to determine coding, MIMO signal processing and a modulation method.

A transmission mode table 164 stores an identifier which uniquely identifies a communication destination, a transmission mode which indicates status of transmission matrix and time when a signal is received from the communication destination. Here, an MAC address is used for the identifier which uniquely identifies a communication destination. The status of transmission matrix should be stored for each communication destination since the status differs from destination to destination. Here, four levels M1 to M4 are arranged for the transmission matrix status. It shall be specified that the level M1 means the best status of communication matrix, and the level M4 means the worst status thereof. Status of transmission matrix may be specified more meticulously. In addition, since status of transmission matrix changes from time to time, effectiveness of information on the transmission matrix can be known by storing the status along with time information.

Then, based on priority of transmit data and transmission mode requested and by applying a certain rule as well as coding, MIMO signal processing and modulation methods are determined.

It should be noted that priority of transmission data shall have been classified into four priority levels as described earlier for the background art. On the other hand, the transmission mode indicating status of transmission matrix is either one of four levels M1 to M4.

Figure 5:
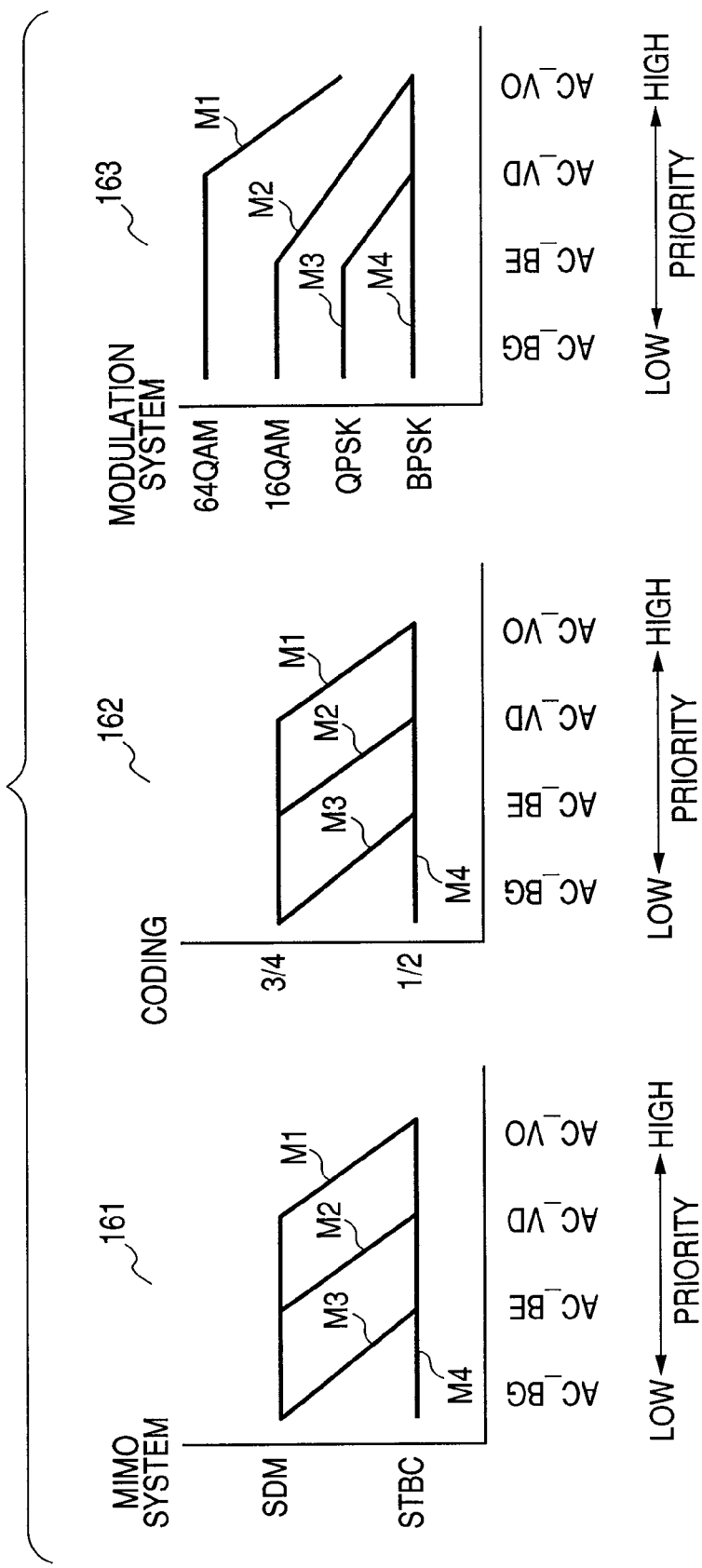
FIG. 5 is a graph showing a rule for determining coding, MIMO signal processing and a modulation method.

MIMO signal processing can be determined, for example, according to graphs 161, 162 and 163 in FIG. 5.

For example, when priority is AC_VO (maximum), a first MIMO signal processing method is used if transmission mode is in the level M1 (transmission matrix: good), and a second MIMO signal processing method is used if transmission mode is either one of the levels M2 to M4 (161). When priority is AC_VD, the second MIMO signal processing method is used regardless of the transmission mode. Likewise, selection of coding method and modulation method (graphs 162 and 163 in FIG. 5) can be uniquely determined based on priority and transmission mode. The following table 2 shows correspondence between such priority levels and, MIMO signal processing, coding and modulation methods.

TABLE 2

| | Transmit mode | priority | | | |
|---|---|---|---|---|---|
| | | AC_BG | AC_BE | AC_VD | AC_VO |
| MIMO method | M1 | SDB | SDM | SDM | STBC |
| | M2 | SDM | SDM | STBC | STBC |
| | M3 | SDM | STBC | STBC | STBC |
| | M4 | STBC | STBC | STBC | STBC |
| Coding | M1 | 3/4 | 3/4 | 3/4 | 1/2 |
| | M2 | 3/4 | 3/4 | 1/2 | 1/2 |
| | M3 | 3/4 | 1/2 | 1/2 | 1/2 |
| | M4 | 1/2 | 1/2 | 1/2 | 1/2 |
| Modulation | M1 | 64QAM | 64QAM | 64QAM | QPSK |
| | M2 | 16QAM | 16QAM | QPSK | BPSK |
| | M3 | QPSK | QPSK | BPSK | BPSK |
| | M4 | BPSK | BPSK | BPSK | BPSK |

Next, operations of the wireless transceiver according to the first embodiment of the present invention will be described with reference to FIGS. 6 to 9.

First, operation steps showing the outline of transmission and reception will be described with reference to FIG. 6.

Figure 6:
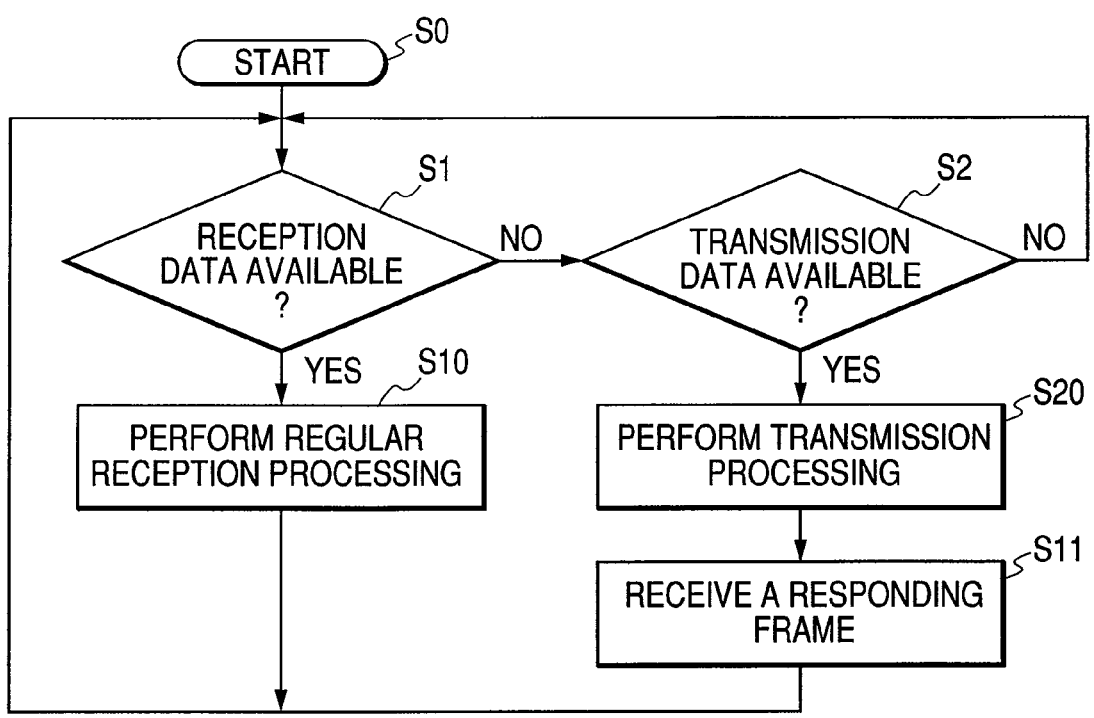
FIG. 6 is a flow chart illustrating the outline of transmission and reception according to the first embodiment of the present invention.

FIG. 6 is a flow chart illustrating the outline of transmission and reception according to the first embodiment of the present invention.

The wireless receiver, upon initiating operations (S0), continuously checks the presence or absence of a receiving signal (S1) as well as that of transmit data (S2). When a receiving signal is present, the wireless receiver executes reception processing (S10) and, again, shifts the step to an operation to confirm the presence or absence of any receiving signal (S1). When transmission data is present, the wireless receiver executes transmission processing (S20), and shifts the step to receive a responding frame (S11) after completion of transmission.

Next, detailed steps of transmission processing (S20) will be described with reference to FIG. 7.

Figure 7:
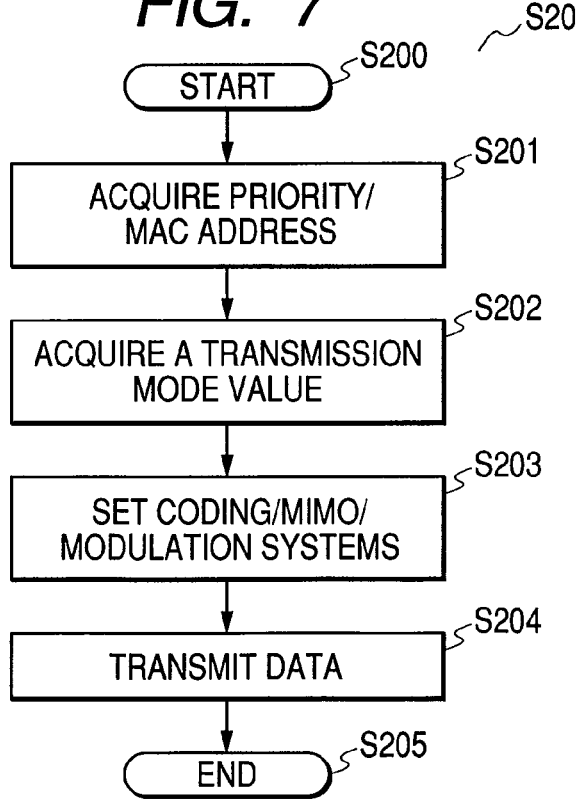
FIG. 7 is a flow chart illustrating detailed transmission operations according to the first embodiment of the present invention.

FIG. 7 is a flow chart illustrating detailed transmission operations according to the first embodiment of the present invention.

When transmission processing (S20) is initiated (S200), the wireless transceiver receives priority of transmit data and an MAC address from the priority control unit 10 (S201). Based on these values, the transmission mode table processing unit 15 selects a transmission mode, as stated earlier, which is associated with the MAC address of the transmission destination, in accordance with a value on the transmission mode table (S202). Based on the value of transmission mode obtained in the above-stated step, the coding/MIMO signal processing/modulation control unit 16, as already described in the above-stated example, determines the coding rate, the MIMO signal processing method and the modulation method. Based on the information, the encoder 11, the MIMO signal processing unit 12 and the modulator 13 execute their own processing (S203), and finally, the data is transmitted from the antenna 18 (S204).

Next, detailed steps of reception processing (S10) will be described with reference to FIG. 8.

Figure 8:
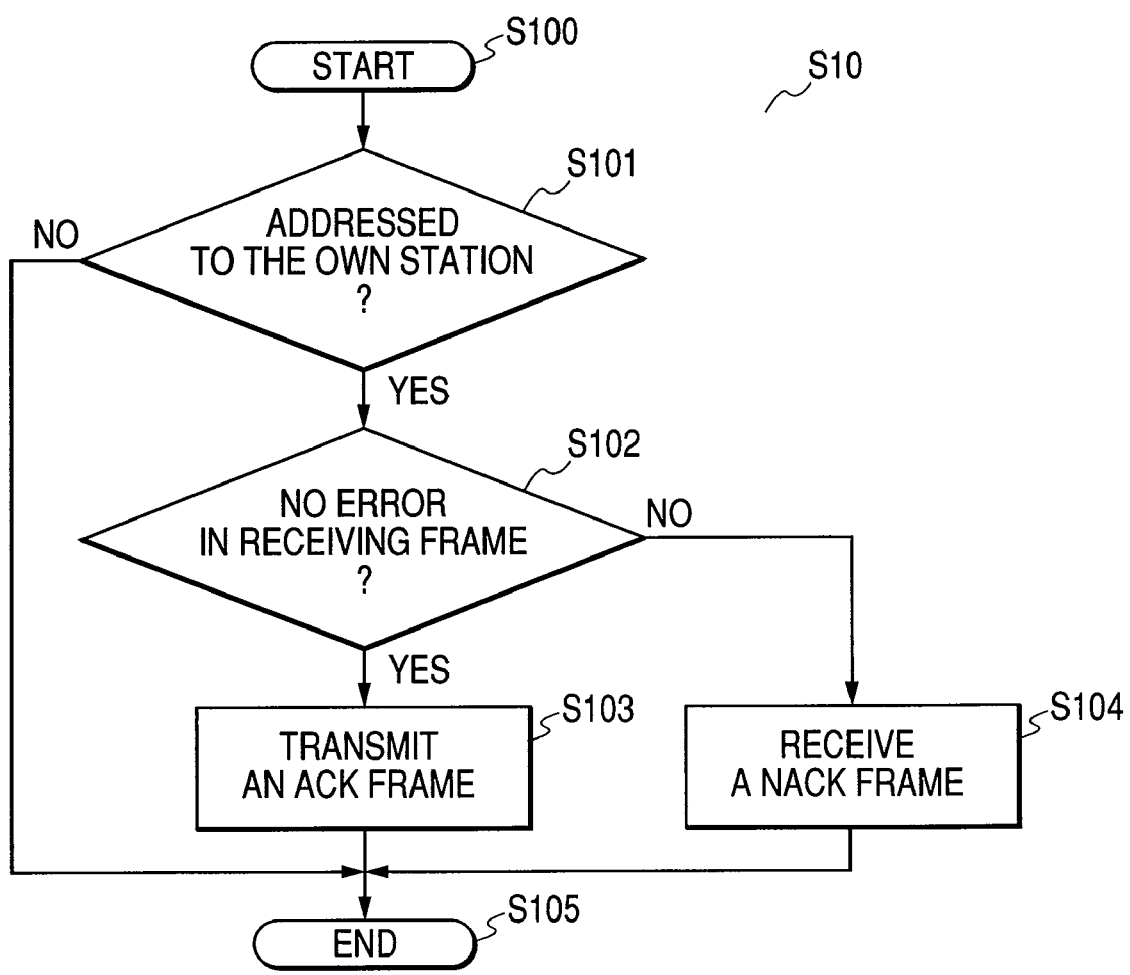
FIG. 8 is a flow chart illustrating detailed operations in a reception step according to the first embodiment of the present invention.

FIG. 8 is a flow chart illustrating detailed operations in reception step according to the first embodiment of the present invention.

When reception processing (S10) is initiated (S100), the wireless transceiver first judges whether or not the data is addressed to the own station (S101). When the data is not addressed to the own station, the wireless transceiver terminates the reception processing (S105). When the data is addressed to the own station, the wireless transceiver checks the presence or absence of any reception frame errors (S102). If there is no error in the reception frame, the transceiver transmits an ACK frame that notifies successful reception (S103) and terminates the reception processing (S105). If any errors exist in the reception frame, the transceiver transmits a NACK frame that notifies unsuccessful reception (S104) and terminates the reception processing (S105).

Next, detailed steps for receiving a responding frame (S11) will be described with reference to FIG. 9.

Figure 9:
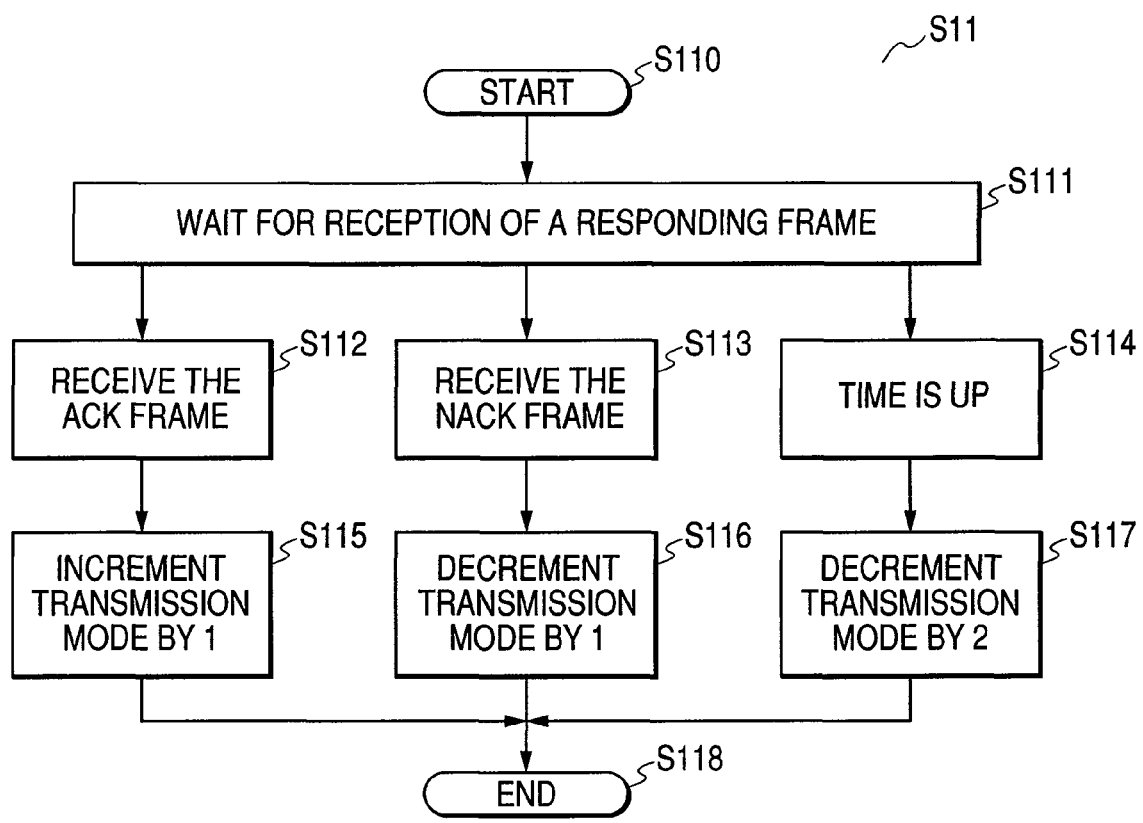
FIG. 9 is a flow chart illustrating detailed steps for receiving a responding frame according to the first embodiment of the present invention.

FIG. 9 is a flow chart illustrating detailed steps for receiving a responding frame according to the first embodiment of the present invention.

When reception of a responding frame (S11) is initiated (S110), the wireless transceiver is put in the status of waiting for reception of a responding frame (S111). When an ACK frame is received within a specified time period or in prescribed timing (S112), the status of transmission matrix is judged to be good, and the transmission mode level is incremented by 1 (S115). For example, when the transmission mode is M2, the mode will be set to M1. When a NACK frame is received within a specified time period or in prescribed timing (S113), the status of transmission matrix is judged to be poor, and the transmission mode value is decremented by 1 (S116). For example, when the transmission mode is M2, the mode will be set to M3. When a responding frame is not received within a specified time period or in prescribed timing (S114), the status of transmission matrix is judged to be very poor, and the transmission mode value is decremented by 2 (S117). For example, when the transmission mode is M2, the mode is set to M4.

The operations shown above makes it possible to realize a wireless transceiver constituting a wireless communication system that controls coding, MIMO signal processing and modulation methods according to priority of transmit data.

With the embodiment, a transmission mode value of the transmission control table is changed depending on the presence or absence of reception of a responding frame, and coding, MIMO signal processing and modulation methods are determined based on the changed transmission mode value and priority. However, when transmit data having the highest priority is transmitted, it may be preliminary determined to have a fixed arrangement that enables selection of coding rate, MIMO signal processing and modulation methods that enables most assured transmission of data even at the sacrifice of data rate.

Second Embodiment

Hereinafter, a second embodiment according to the present invention will be described with reference to FIGS. 10 and 11.

Figure 10:
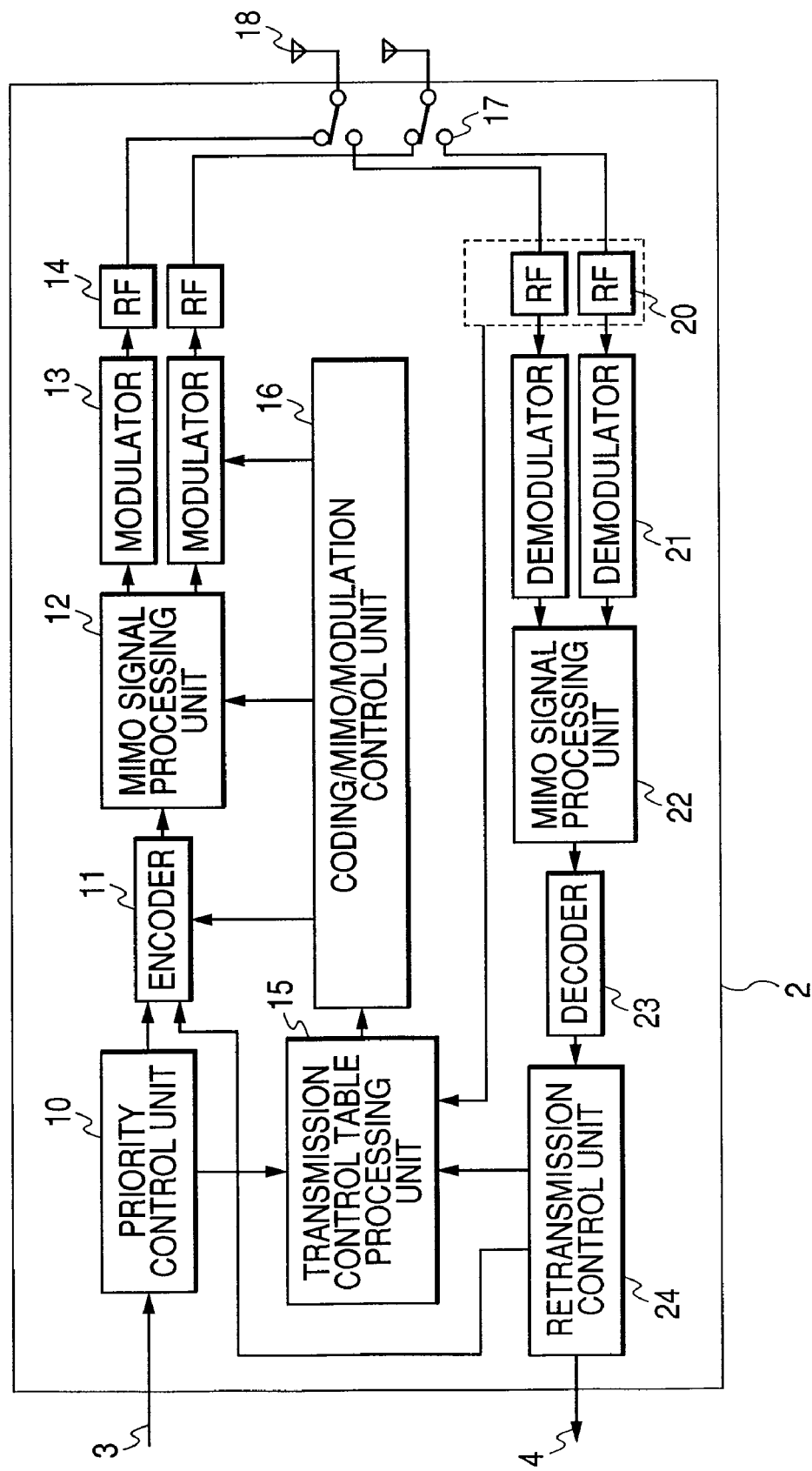
FIG. 10 is a configuration diagram of a transceiver according to a second embodiment of the present invention.

FIG. 10 is a block diagram of a transceiver according to the second embodiment of the present invention.

Figure 11:
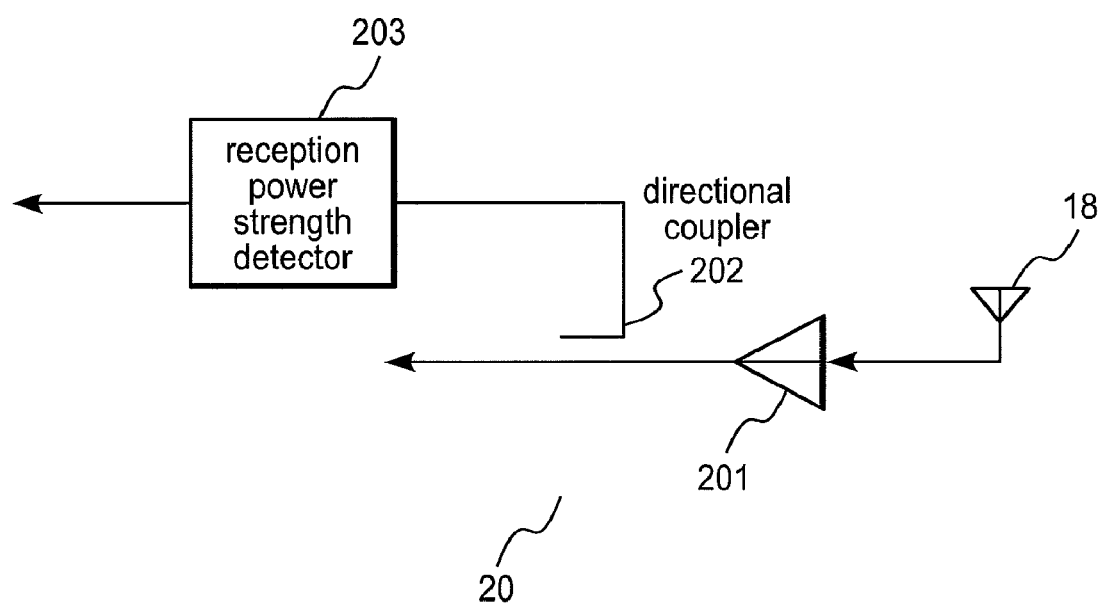
FIG. 11 is a configuration diagram for measurement of reception signal strength at a reception RF unit.

FIG. 11 is a configuration diagram for measurement of reception signal strength at a reception RF unit.

With the first embodiment, quality of a transmission matrix is assumed by using a responding frame, and the transmission mode table is updated based on the quality assumption.

On the other hand, the second embodiment refers to a method wherein quality of a transmission matrix is assumed based on reception signal strength upon receipt of a responding frame and the transmission table is updated based on the quality assumption.

As shown in FIG. 10, with the embodiment, it is possible to learn quality of a transmission matrix by measuring strength of a reception signal in a reception RF unit 20 and notifying the signal strength of the transmission mode table. This is because it can be judged that quality of a transmission matrix becomes better as the reception signal strength becomes larger.

A specific method for measuring the reception signal strength in the reception RF unit is as shown in FIG. 11. That is to say, a signal received from the antenna 18 is amplified with a low-noise amplifier 201 and part of the amplified signal is input to a reception power strength detector 203 by using a directional coupler 202.

Third Embodiment

Hereinafter, a third embodiment according to the present invention will be described with reference to FIG. 12.

Figure 12:
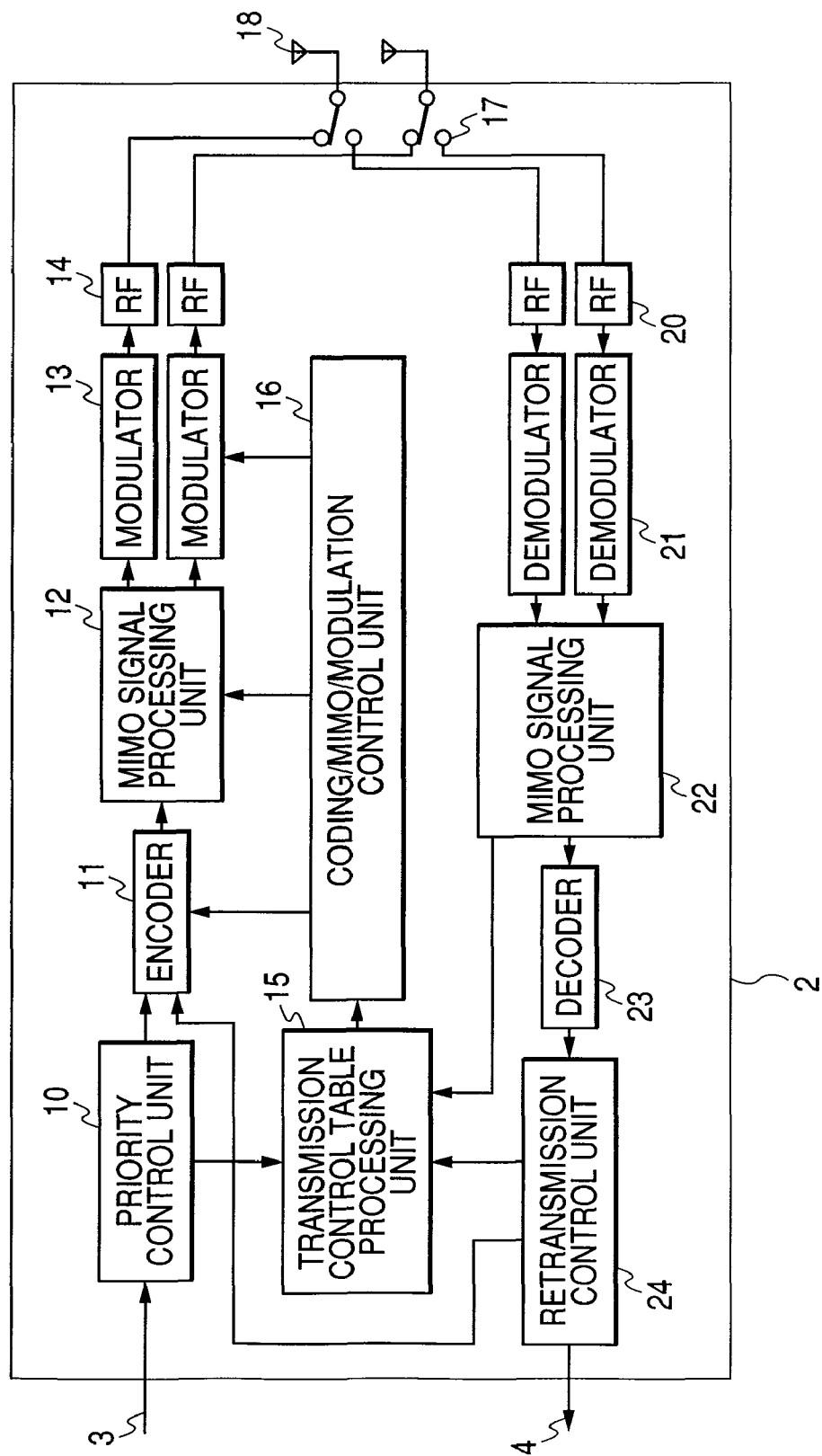
FIG. 12 is a configuration diagram of a transceiver according to a third embodiment of the present invention.

FIG. 12 is a configuration diagram of a transceiver according to the third embodiment of the present invention.

In this embodiment, data from a reception MIMO signal processing unit is used for assuming quality of a transmission matrix and updating a transmission mode table based on the assumed quality.

In the reception MIMO signal processing unit, a transmission matrix is set up for receiving a MIMO signal. Therefore, it is possible to assume quality of the transmission matrix by obtaining eigen values of the transmission matrix upon receipt of a responding frame and judging sizes of such eigen values. Judgment is made that the status of transmission matrix is better as the total of eigen values is larger, or conversely, the status of transmission matrix is poorer as the total of eigen values is smaller. Base on such judgment, it is possible to update the transmission table 15.

The above-stated embodiments can provide a wireless communication system composed of a MIMO wireless transceiver, in which coding, MIMO signal processing and modulation methods are controlled according to priority of transmission data. More specifically, a wireless communication system can be provided which executes assured transmission of data having higher priority and improves throughput in total when a plurality of types of data are transmitted.

As described above, the present invention can provide a wireless communication system composed of an MIMO wireless transceiver, in which coding, MIMO signal processing and modulation methods are controlled according to priority of transmit data.

What is claimed is:

1. A wireless transceiver which executes transmission and reception of data wirelessly by using at least two antennas, said wireless transceiver comprising:
   a priority control unit which judges priority of transmit data, said priority being predetermined; and
   a transmission mode table in which an identifier that uniquely identifies a transmission destination is associated with a transmission mode that indicates channel status of transmission matrix of a communication destination for each said transmission destination,
wherein a switching is made between a Space Division Multiplexing (SDM) method and a Space Time Coding (STC) method, based on priority of said transmit data,
wherein said SDM method distributes as a plurality of transmission streams, and transmits said transmit data,
wherein said STC method performs time-space encoding on said transmit data, and
wherein, when data is transmitted to a transmission destination identified by said identifier, a switching is made between said SDM method and said STC method based on the priority of said transmit data and the transmission mode of said transmission mode table.

2. The wireless transceiver according to claim 1, further comprising:
wherein said transmission mode is updated to another transmission mode that is associated with said transmission destination based on a reception signal from said transmission destination.

3. The wireless transceiver according to claim 2,
wherein, if reception data is received without error upon receipt of the data, an ACK frame is transmitted within a specified time period or in prescribed timing, and if the reception data is received erroneously, a NACK frame is transmitted within a specified time period or in prescribed timing, and
wherein said transmission mode is updated based on the presence or absence of reception of the ACK frame or the NACK frame.

4. The wireless transceiver according to claim 2,
wherein, if reception data is received without error upon receipt of the data, an ACK frame is transmitted within a specified time period or in prescribed timing, and if the reception data is received erroneously, a NACK frame is transmitted within a specified time period or in prescribed timing,
and wherein said transmission mode is updated based on signal strength of a reception signal of the ACK frame or the NACK frame.

5. The wireless transceiver according to claim 2,
wherein if reception data is received without error upon receipt of the data, an ACK frame is transmitted within a specified time period or in prescribed timing, and if the reception data is received erroneously, a NACK frame is transmitted within a specified time period or in prescribed timing, and
wherein said transmission table is updated based on an eigen value of a transmission matrix of a reception signal of the ACK frame or the NACK frame.

6. The wireless transceiver according to claim 2,
wherein if reception data is received without error upon receipt of the data, an ACK frame is transmitted within a specified time period or in prescribed timing, and if the reception data is received erroneously, a NACK frame is transmitted within a specified time period or in prescribed timing, and wherein said transmission mode is updated based on a channel information of the ACK frame or the NACK frame.

7. The wireless transceiver according to claim 2,
wherein if reception data is received without error upon receipt of the data, an ACK frame is transmitted within a specified time period or in prescribed timing, and if the reception data is received erroneously, a NACK frame is transmitted within a specified time period or in prescribed timing, and
wherein said transmission table is updated based on a channel information of the ACK frame or the NACK frame.

8. A wireless transceiver which executes transmission and reception of data wirelessly by using at least two antennas, said wireless transceiver comprising:
a priority control unit which judges priority of transmit data, said priority being predetermined; and
wherein a switching is made between a Space Division Multiplexing (SDM) method and a Space Time Coding (STC) method, based on priority of said transmit data,
wherein said SDM method distributes as a plurality of transmission streams, and transmits said transmit data,
wherein said STC method performs time-space encoding on said transmit data, and
wherein either a modulation method or a coding method is selected based on the priority that is judged in said priority control unit.

9. The wireless transceiver according to claim 8,
wherein said transmission mode is updated to another transmission mode that is associated with said transmission destination based on a reception signal from said transmission destination.

10. The wireless transceiver according to claim 9,
wherein, if reception data is received without error upon receipt of the data, and ACK frame is transmitted within a specified time period or in prescribed timing, and if the reception data is received erroneously, a NACK frame is transmitted within a specified time period or in prescribed timing, and
wherein said transmission mode is updated based on a channel information of the ACK frame or the NACK frame.

11. The wireless transceiver according to claim 9,
wherein if reception data is received without error upon receipt of the data, an ACK frame is transmitted within a specified time period or in prescribed timing, and if the reception data is received erroneously, a NACK frame is transmitted within a specified time period or in prescribed timing, and
wherein said transmission table is updated based on a channel information of the ACK frame or the NACK frame.

12. A wireless transceiver which executes transmission and reception of data wirelessly by using at least two antennas, said wireless transceiver comprising:
a priority control unit which judges priority of transmit data, said priority being predetermined; and
wherein a switching is made between a Space Division Multiplexing (SDM) method and a Space Time Coding (STC) method, based on priority of said transmit data,
wherein said SDM method distributes as a plurality of transmission streams, and transmits said transmit data,
wherein said STC method performs time-space encoding on said transmit data, and
wherein, when said priority is low, said SDM method is used, and when said priority is high, said STC method is used.

13. The wireless transceiver according to claim 12,
wherein said transmission mode is updated to another transmission mode that is associated with said transmission destination based on a reception signal from said transmission destination.

14. The wireless transceiver according to claim 13,
wherein, if reception data is received without error upon receipt of the data, and ACK frame is transmitted within a specified time period or in prescribed timing, and if the reception data is received erroneously, a NACK frame is transmitted within a specified time period or in prescribed timing, and wherein said transmission mode is updated based on a channel information of the ACK frame or the NACK frame.

15. The wireless transceiver according to claim 13, wherein reception data is received without error upon receipt of the data, an ACK frame is transmitted within a specified time period or in prescribed timing, and if the reception data is received erroneously, a NACK frame is transmitted within a specified time period or in prescribed timing, and wherein said transmission table is updated based on a channel information of the ACK frame or the NACK frame.

* * * * *